Aug. 21, 1962    P. PATZ ETAL    3,050,294
POWER CUTTER MECHANISM FOR SILAGE UNLOADERS
Filed July 13, 1961    3 Sheets-Sheet 1

INVENTORS
P. Patz
E. A. Graetz
BY Lieber, Lieber & Nilles
Attorneys

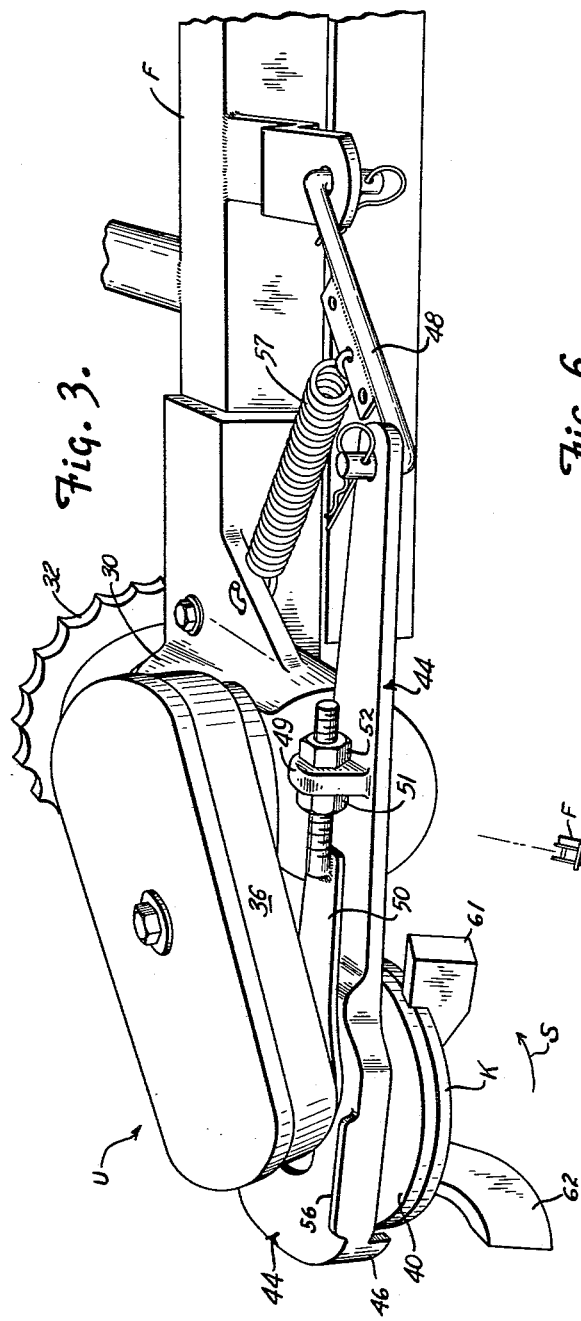
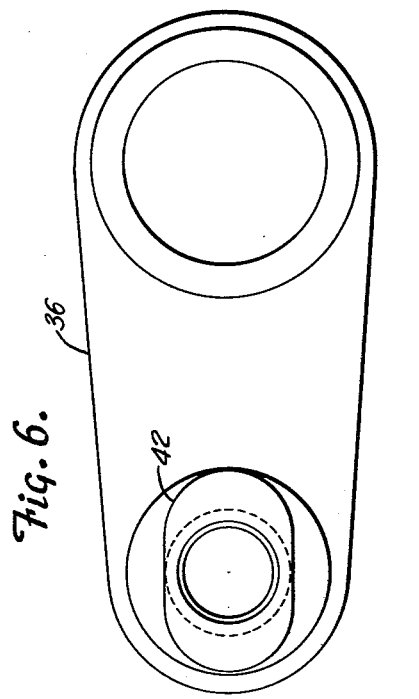
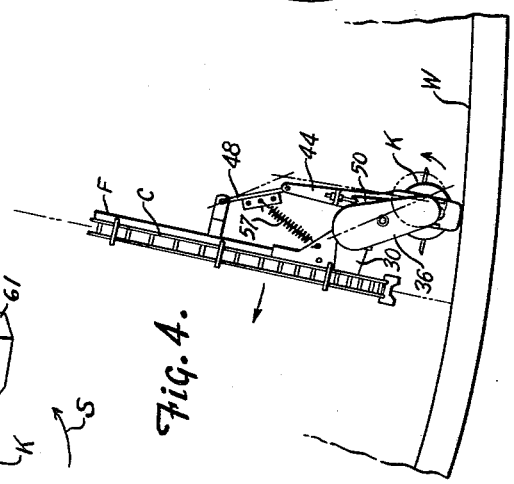

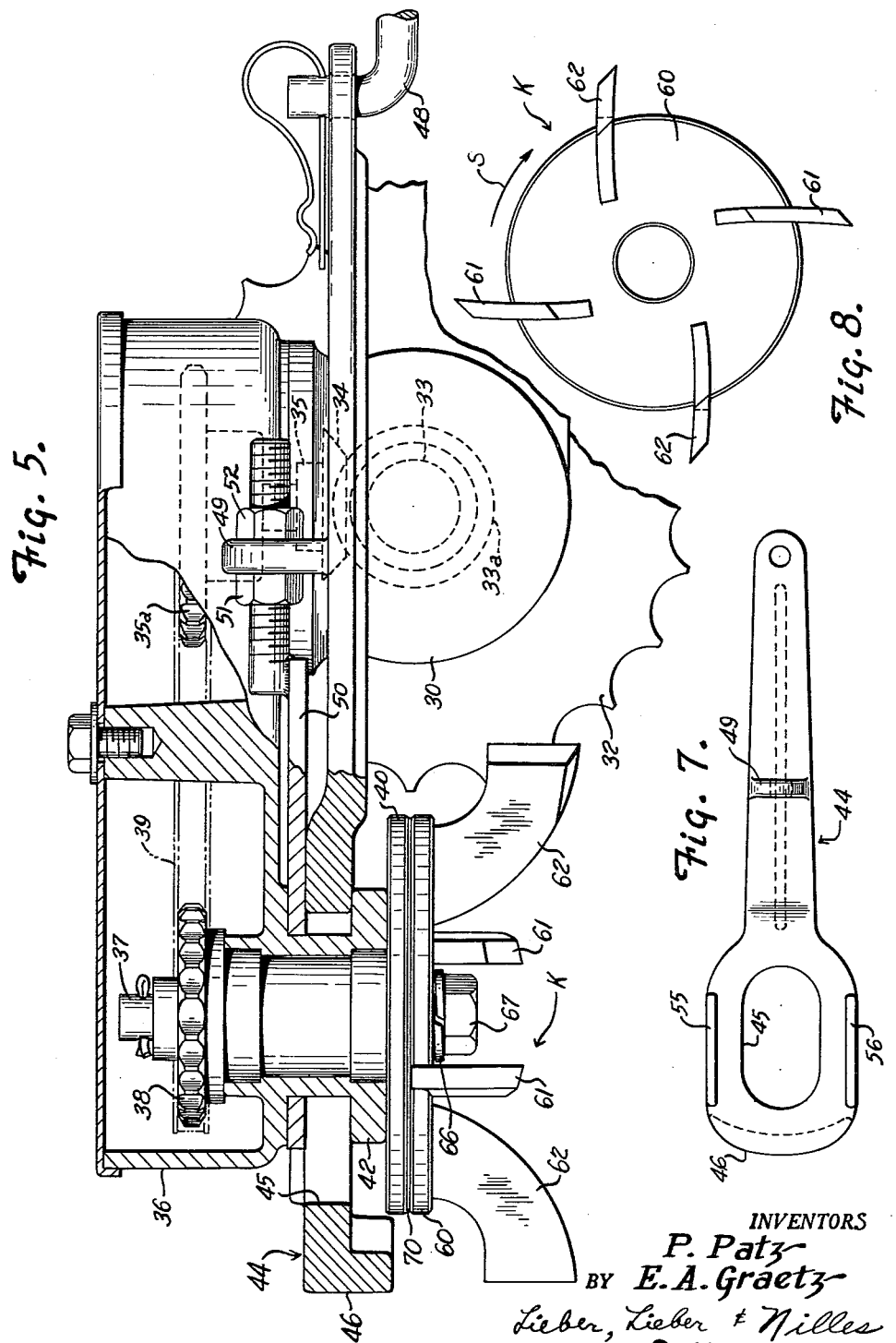

United States Patent Office 3,050,294
Patented Aug. 21, 1962

3,050,294
POWER CUTTER MECHANISM FOR SILAGE UNLOADERS
Paul Patz and Edward A. Graetz, Pound, Wis.
Filed July 13, 1961, Ser. No. 123,841
10 Claims. (Cl. 262—19)

This invention relates generally to silo unloaders of the type which are located on top of the silage and have a gathering conveyor extending radially from the center of the silo to closely adjacent the inside of the silo wall. These unloaders pull the silage inwardly to a centrally located blower for discharge out of the silo. More particularly, the present invention relates to an improved rotary power cutter located adjacent the free or outer end of the conveyor and which serves to clean frozen ensilage, for example, from the silo wall as the conveyor rotates around the silo and workers its way downwardly in unloading the silo. The outer end of the conveyor must be spaced slightly from the inside of the silo wall and cannot itself clean the inside of the wall as it revolves around the silo and therefore these power cutters are necessary to thoroughly clean this frozen ensilage, which in effect is "reinforced ice," from the wall.

Conventional power cutters have not heretofore proved entirely satisfactory for several reasons. For example, the ensilage is often frozen to the inner surface of the silo wall or otherwise tightly caked thereon. In addition, some silo walls contain flat spots or corners which are not readily accessible, such as are created by flat doors, concrete block construction or generally unsmooth or not truly circular surfaces. Some conventional cutters have been mounted for rotation about an axis which did not permit the knife to approach the wall with the desired degree of proximity and they consequently could not closely follow the contour of the wall.

Still other cutter units were so mounted that they did not maintain the same angular relationship to the wall for all distances of the cutter unit from the wall. As the guard shoes of these units wore from contact with the wall, the cutter blades themselves did not maintain a constant predetermined distance from the wall because different portions of the shoe would contact the wall and the distances of the cutter blades from these various portions were different. Stated otherwise, as the cutter unit moved relative to the outer end of the conveyor in accommodating the above-mentioned flat spots and corners, different portions of the guide shoe would contact the wall, and as a result, the distance of the cutter blades from the wall would vary and the wall was not properly cleaned.

Accordingly, the present invention provides an improved rotary power cutter unit for silo unloaders, which unit overcomes the above-mentioned difficulties and shortcomings of prior devices.

The cutter unit provided by the present invention is capable of closely following the contour of the inside of the wall and thoroughly cleaning frozen ensilage and the like from the wall. The swingable mounting for the unit, by means of which it is resiliently biased against the wall, insures that the same spot or location on the guard shoe will always contact the wall, and regardless of the distance of the shoe from the end of the conveyor. More specifically, the unit moves to and from the wall and in respect to the conveyor at a constant angular relationship.

These and other objects and advantages will appear hereinafter as this disclosure progresses, reference being had to the accompanying drawings, in which:

FIGURE 3 is another fragmentary perspective view of the power cutter unit, the view being taken generally from the rear side of the cutter;

FIGURE 4 is a fragmentary schematic plan view of the cutter in relationship to the silo wall from which the cutter forcibly removes the silage;

FIGURE 5 is a rear side elevational view of the cutter unit on an enlarged scale and with parts broken away for clarity;

FIGURE 6 is a bottom view of the drive housing shown in FIGURE 5, but on a reduced scale;

FIGURE 7 is a plan view of the knife guide or shoe shown in FIGURE 5, but on a reduced scale;

FIGURE 8 is a bottom view of the knife; and

Figure 1:
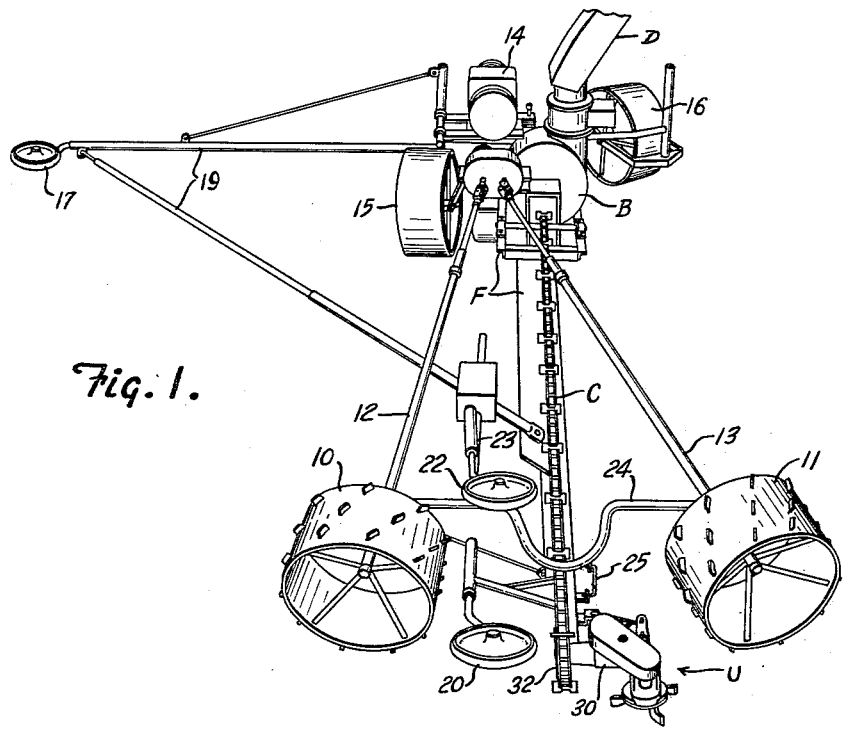
FIGURE 1 is a perspective view taken generally from the outer end of a silo unloader which utilizes a power cutter made in accordance with the present invention.
Figure 2:
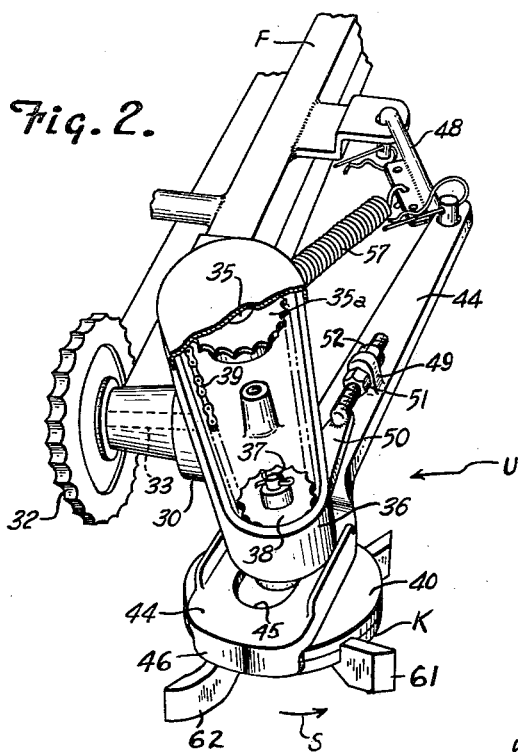
FIGURE 2 is a fragmentary perspective view taken generally from the outer and rear side of the cutter unit shown in FIGURE 1, but on an enlarged scale, and with certain parts broken away for clarity.
Figure 9:
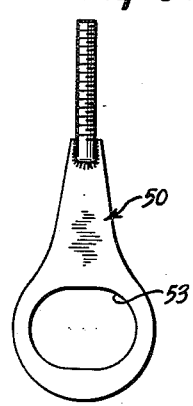
FIGURE 9 is a plan view of the knife guide and adjuster.

Referring in greater detail to the drawings, the silo unloader with which the present invention will be shown and described may be of the type shown in the co-pending United States application, Serial No. 831,362, filed August 3, 1959, now issued as Patent No. 3,013,674 on December 19, 1961, and entitled, "Silage Unloading Mechanism," and if a complete description of the structure and operation of that unloader is deemed necessary or desirable, reference may be had to that application. It is believed sufficient to say for the purposes of this disclosure, however, that the unloader generally consists of a pair of traction wheels 10 and 11 which are driven by their respective drive shafts 12 and 13 from a power source 14 located generally centrally in the silo. A blower unit B acts to receive the material which has been conveyed into it by the endless conveyor C, and blows it through the spout D and out of the silo. A pair of vertically adjustable support wheels 15 and 16 are rotatably mounted adjacent the inner end of the unloader for support thereof. A forward guide wheel 17 is rotatably carried at the outer end of its supporting structure 19 attached to the unloader frame F. A thrust absorbing guide wheel 20 is carried adjacent the outer end of the conveyor and is adapted to ride against the silo wall W as the unloader revolves about the silo. Positioned directly above and in vertical alignment with the guide wheel 20 is the depth leveling wheel 22 carried on the end of the arm 23. An arm 23 in turn is swingably mounted on the cross yoke 24, the latter of which has link connection 25 with the outer end of the conveyor frame. The function of the depth leveling wheel is to maintain the conveyor in a level position and prevent it from gouging into the silage material and thereby stalling the machine.

When in normal operating position the outer end of the conveyor is located closely adjacent to the silo wall but out of contact therewith. The depth leveling wheel and its associated guide wheel act to insure that the outer end of the conveyor is not driven against or into contact with the wall by the action of the conveyor as it scrapes the material toward the center of the silo. On the other hand, it is essential that the inside surface of the silo wall be thoroughly cleaned or scraped free of frozen ensilage, ice, or the like, as the unloader revolved about the silo and works its way downwardly in the silo. The present invention provides an improved rotary power driven cutter unit U carried at the outer end of the conveyor which serves to thoroughly clean the silo wall.

As the depth leveling wheel and the two guide wheels rotate against the silo wall when the unloader rotates in the silo, frozen silage, flat spots, or other corners and obstructions on the silo wall may be encountered by the power cutter. Furthermore, the silo wall is not always round which further has caused difficulties in conventional power cutters.

The power cutter provided by the present invention insures that the cutter blades are maintained at a predetermined and constant distance from that portion of the wall being cleaned, and results in complete cleaning of the wall.

The cutter unit U is mounted by its gear case 30 on the end of frame member F. A conveyor sprocket 32 is rotatably mounted on a shaft 33 extending into the gear case. The inner end of this shaft has a bevel gear 33a fixed to it which is in constant mesh with another bevel gear 34. An upwardly extending shaft 35 is fixed to this second bevel gear and extends into the drive housing 36. A sprocket 35a is secured to the upper end of this shaft and is located within the drive housing. The drive housing is oscillatable in relation to the gear case about the shaft 35. A cutter shaft 37 extends downwardly from the other end of the drive housing and has a sprocket 38 fixed to its upper end. A drive chain 39 is trained around both of the sprockets located in the drive housing. The lower end of the cutter shaft extends downwardly and has secured thereto the cutter knife K. This cutter knife bears firmly against the large flange 40 rigidly secured to the knife shaft and which may be formed integrally therewith.

As shown in FIGURES 5 and 6, the lower end of the drive housing has a projection 42 which is oblong in shape and forms a non-circular flange. An elongated knife guide 44 has an elongated opening 45 in its enlarged end, which opening is adapted to be slipped over the elongated flange 42 when they are at approximate right angles or in alignment with one another. When the guide is turned from the aligned position to that shown in the figures, it is securely held in relationship to the drive housing. The outer end of the guide has a reinforced portion 46 which is adapted to bear against the silo wall when the unit is in operation. This guide serves to hold the blades of the cutter a predetermined distance from the silo wall, which distance is just sufficient to prevent the blades from contacting the wall. The other end of the guide is secured to the frame F by the pivot link 48. The length of the link is the same as the distance between the center of shafts 35 and 37. With this parallel linkage connection, the guide can swing to and from the silo wall without changing its attitude in respect thereto. In other words, any position of the guide relative to the wall is parallel to any other. This has the effect of insuring that the same location of the reinforced portion 46 contacts the silo wall regardless of the distance of the conveyor C from the wall. Thus once the knife blades have been adjusted relative to the portion 46 they will maintain the same distance from the wall and this distance will not be changed due to the guide contacting the wall at different locations thereof, some of which locations may have worn differently than others.

The guide 44 has an apertured upstanding portion 49 through which the threaded end of a knife guide adjuster 50 is inserted and adjustably held therein by the lock nuts 51 and 52. The adjuster also has an elongated opening 53 in its enlarged end, which opening is adapted to slip over the flange 42 of the housing when in alignment therewith and then swung from the aligned position to be locked on the housing. The knife shaft passes through both opening 53 of the adjuster and opening 45 of the knife guide. When the unit is assembled, however, it will be noted that the guide is free to slide back and forth a considerable distance over the knife shaft. The length of the opening of the adjuster, however, is arranged at about 90° from the length of opening 45 and therefore the position of the adjuster is fixed relative to the cutter and its shaft. The guide is adjusted relative to the cutter to vary the cutter distance from the wall by turning the lock nuts 51 and 52 in one direction or another. In other words, by adjusting these nuts, the guide is shifted relative to the rest of the unit, this shifting being possible because of the elongated opening 45 which slides past the cutter shaft.

The upper surface of the enlarged end of the guide has a pair of spaced apart ridges 55, 56 which serve to keep the large end of the adjuster located centrally thereon.

For the purpose of resiliently biasing the cutter against the silo wall, a heavy tension spring 57 acts between the link 48 and the gear case.

The drive to the cutter is furnished through the endless conveyor and its outer sprocket, then through the bevel gears 33a and 34, sprockets 35a and 38, and cutter shaft 37.

The cutter itself which acts to thoroughly clean the silo wall consists of a disk 60 having two pairs of blades 61 and 62 secured thereto as by welding, one of these blades are vertically spaced or offset from the other, and thereby alternate blades do not cover the same area of the silo wall but instead the staggered blades act together to cover a vertical distance of the silo wall which is defined by the total height of the blades. The direction of this cutter is shown by the curvilinear arrow S and it will be noted the outer edges of the blades are inclined rearwardly in respect to the direction of this rotary travel, thus presenting a sharp leading edge.

Means are provided for permitting the cutter to slip relative to its shaft and thus provide a safety feature in the event of striking an unremovable obstacle. For this purpose a large lock washer 66 is secured at the underside of the cutter and held in place by the nut 67. In order to permit slippage between the cutter and the flange 40 of the shaft when a predetermined load is encountered, and to prevent steel-to-steel contact between the relatively slipping parts, a flat aluminum disk 70 is inserted between the flange 40 and the cutter.

In order to assemble or disassemble the unit for inspection or repair, it is only necessary to remove the nut 67. When this is done the cutter can be easily removed and the guide and adjuster need only be rotated slightly to free them from being held captive by the oblong flange 42.

The cutter is mounted for rotation about a vertical axis and a clean and thorough sweep of the silo wall is assured because this axis of rotation is parallel to the silo wall and the cutter can thereby closely follow the contour of the wall, the degree of closeness being determined by the position of the cutter relative to the outer end of the guide. This distance can furthermore be readily adjusted by turning the adjusting nuts 51 and 52. By staggering of the teeth in a vertical direction the impact load of the entire width of the cut is not imposed by any one tooth.

As shown in FIGURE 4, the arm swings away from the silo wall to a position indicated by the dotted lines. It will be noted this dotted line position is parallel to the full line position of the guide shown in this figure. In this manner, regardless of the distance between the outer end of the conveyor and the silo wall, the same portion of the guide will contact the silo wall.

Various modes of carrying out the invention are contemplated as being within the scope of the following claims particularly pointing out and distinctly claiming the subject matter which is regarded as the invention:

1. In a silo unloader having an ensilage conveyor including an outer end that is revolved around the inside of the silo wall in close proximity thereto, a power cutter unit on said conveyor and adjacent said end, and means for mounting said cutter unit on said conveyor for translating said cutter unit relative to said conveyor and wall and towards said wall, and maintaining said cutter unit at a substantially constant angular relationship relative to the wall, said cutter unit comprising blades mounted for rotation about a generally vertical axis, said power cutter also including guide means for limiting said blades to a predetermined distance from said wall.

2. In a silo unloader having an ensilage conveyor including an outer end that is revolved around the silo wall in close proximity thereto, a power cutter unit mounted on said conveyor and adjacent said end, and means for translating said unit toward said wall and at a substantially constant angular relationship relative to said conveyor regardless of the distance therefrom.

3. In a silo unloader having an ensilage conveyor including an outer end that is revolved around the silo wall in close proximity thereto; a power cutter unit mounted on said conveyor and adjacent said end and comprising, rotary blades for cutting material from said wall, a guide shoe for bearing against said wall and limiting said blades to a predetermined distance from the wall; and means for translating said unit towards said wall and at a substantially constant angular relationship relative to the wall and to said conveyor.

4. In a silo unloader having an ensilage conveyor including an outer end that is revolved around the silo wall in close proximity thereto, a rotary power cutter unit mounted on said conveyor and adjacent said end, said unit having blades mounted for rotation about a generally vertical axis, and means for translating said unit toward said wall and at a substantially constant angular relationship relative to the wall and to said conveyor.

5. In a silo unloader having an ensilage conveyor including an outer end that is revolved around the silo wall in close proximity thereto, a power cutter unit mounted on said conveyor and adjacent said end, and a parallel linkage connection between said unit and conveyor for translating said unit toward said wall and at a substantially constant angular relationship relative to the wall and to said conveyor.

6. In a silo unloader having an ensilage conveyor including an outer end that is revolved around the silo wall in close proximity thereto; a power cutter unit mounted on said conveyor and adjacent said end and comprising, rotary blades for cutting material from said wall, a guide shoe for bearing against said wall and limiting said blades to a predetermined distance from the wall; and a parallel linkage connection between said unit and conveyor for translating said unit toward said wall and at a substantially constant angular relationship relative to the wall and to said conveyor.

7. In a silo unloader having an ensilage conveyor including an outer end that is revolved around the silo wall in close proximity thereto, a power cutter unit mounted on said conveyor and adjacent said end and including guide means for limiting said unit to a predetermined distance from the wall, and means for translating said unit toward said wall and at a substantially constant angular relationship relative to the wall and to said conveyor.

8. A power cutter for a silo unloader comprising, a drive housing adapted to be swingably mounted at one end to said unloader and having a free end, a guide shoe pivotally mounted intermediate its length at said free end, said shoe having a wall contacting portion and a rear end, a link pivotally connectable between said unloader and said rear end whereby said shoe will swing in parallelism relative to said unloader, a rotary cutter mounted about a generally vertical axis on said housing free end and adjacent said portion, and drive means connected between said unloader and said rotary cutter.

9. A device as defined in claim 8 including adjustable means for changing the position of the cutter relative to the guide shoe.

10. A device as defined in claim 8, further characterized in that said housing has an elongated portion and said guide shoe has an aperture which is registrable with and complementary to said portion whereby said guide can be removed from said housing when said portion and aperture are in registry.

References Cited in the file of this patent
UNITED STATES PATENTS

| | | |
|---|---|---|
| 2,445,056 | Cordis | July 13, 1948 |
| 2,888,253 | Van Dusen | May 26, 1959 |